United States Patent [19]

Young

[11] 4,428,247
[45] Jan. 31, 1984

[54] TRANSMISSION

[75] Inventor: Robert A. Young, Benton, Ark.

[73] Assignee: Eaton Corporation, Cleveland, Ohio

[21] Appl. No.: 288,858

[22] Filed: Jul. 31, 1981

[51] Int. Cl.³ .......................... F16H 3/08; F16D 21/02
[52] U.S. Cl. ...................................................... 74/331
[58] Field of Search ................. 74/358, 357, 331, 371, 74/372; 192/48.91

[56] References Cited

U.S. PATENT DOCUMENTS

| 3,046,807 | 7/1962 | Barth et al. | 74/331 |
|---|---|---|---|
| 3,138,965 | 6/1964 | Brey | 74/331 |
| 3,500,695 | 3/1970 | Keiser | 74/357 |
| 3,534,607 | 10/1970 | Selzer | 74/332 |
| 3,593,596 | 7/1971 | Race | 74/720 |
| 3,600,962 | 8/1971 | Ivanchich | 74/372 |
| 3,757,598 | 9/1973 | Van Dest | 74/473 R |
| 3,799,002 | 3/1974 | Richards | 192/48.91 |
| 4,136,575 | 1/1979 | Labat | 74/359 |
| 4,152,949 | 5/1979 | Vandervoort | 74/331 |

Primary Examiner—Allan D. Herrmann
Assistant Examiner—Bruce F. Wojciechowski
Attorney, Agent, or Firm—C. H. Grace; H. D. Gordon

[57] ABSTRACT

A simple change gear transmission utilizing an improved clutch structure and/or an improved idler structure to provide compounded countershafts is provided. The improved clutch structure involves the use of axially adjacent tube clutch members (76, 90) operated by side-by-side shift forks (86, 100) to selectively clutch one at a time four axially adjacent mainshaft gears (50, 52, 54, 56) to a mainshaft (18). Compound countershaft (16) comprising a forward portion (20) and a rearward portion (22) are provided for increasing the number and/or range of gear ratios. A combination tube clutch-idler shaft (108) is utilized to provide increased reduction to the rearward countershaft portion for first gear and reverse gear operation of the transmission.

15 Claims, 5 Drawing Figures

TRANSMISSION

BACKGROUND OF THE INVENTION

1. Field of the Invention

This invention relates to change gear transmissions and in particular to simple change gear transmissions utilizing multiple compounded countershafts and having a unique sliding tube clutch structure.

2. Description of the Prior Art

Simple transmissions, that is transmissions utilizing a one piece mainshaft, are well known in the prior art. Transmissions utilizing either simple or compound mainshafts in connection with multiple countershafts wherein either the mainshaft gears or the countershaft gears are mounted in a radially floating manner relative to the other gears are well known in the prior art. Examples of such transmissions may be seen by reference to U.S. Pat. Nos. 3,105,395; 3,255,644; 3,283,613; 3,335,616; 3,349,635; 3,378,214; 3,500,695; 3,648,546 and 3,799,002 all of which are hereby incorporated by reference.

The prior art transmissions, particularly those transmissions utilizing a floating mainshaft and/or floating mainshaft gears in connecting with multiple countershafts, have proven to be highly acceptable. However, to achieve a sufficiently large range of available gear ratios, it has generally been necessary to utilize a compound transmission. Such transmissions generally comprise a main transmission section connected in series with an auxiliary transmission section of either the "range" type or the "splitter" type or a combination thereof as is well known in the prior art. Such transmissions are highly effective and commercially successful, especially for use in heavy duty vehicles wherein a large range of ratios is required and/or a large number of individual gear ratios is required. Such heavy duty compound transmissions typically have 9, 10, 12, 13 or more forward gear ratios.

There has, however, developed a need for transmissions having a greater range of ratios and/or a greater number of ratios than is normally available in a simple countershaft simple transmission as the centerline distances and/or countershaft length required in prior art simple transmissions to provide same would become too great yet not justifying the somewhat expensive structure and controls required for a compound transmission.

To meet this need, simple transmissions utilizing compounded countershafts have been proposed. An example of such a simple transmission utilizing compounded countershafts may be seen by reference to U.S. Pat. Nos. 4,152,949 and 4,269,077 both hereby incorporated by reference. Such transmissions, while suitable for many purposes, are not totally satisfactory for certain applications as the clutch and/or idler structure required an axial dimension which might be excessive and/or prevent widening of the gear tooth faces for increased torque transmitting capacity. The prior art transmissions often were also not totally satisfactory as a standard "H" or "double H" type shift pattern was not provided and/or required a complicated lever mechanism.

SUMMARY OF THE INVENTION

In accordance with the present invention, a simple transmission which minimizes center distances, i.e. the distance between the mainshaft and the countershaft axes, minimizes the axial length of the transmission and/or allows the use of increased width gear faces for higher torque transmitting capacity, allows the gears to be arranged in a standard manner for an "H" or "double H" type shift pattern without the necessity of complicated levers or controls and/or provides a greater range and/or number of available gear ratios than has heretofore been available is provided. The transmission preferably utilizes a floating mainshaft in connection with multiple substantially identical multiple countershafts, each of said compounded countershafts being compounded to provide an extended range of ratios with a minimal center distance and minimum axial length of countershaft portion. The countershafts are compounded by the use of an idler sleeve which surrounds the mainshaft, preferably in a floating manner, and also serves as a clutch member.

Preferably, four of the mainshaft gears are directly clutchable to the mainshaft by means of two adjacent sliding tube clutches which are engaged by two side by side shift forks which engage the adjacent ends of the tube clutches thereby requiring a minimum of axial space. One of the four above-mentioned gears, preferably the second speed gear is directly clutchable to the mainshaft to provide second speed operation and is clutchable to the idler to provide a driving connection to the compound countershaft double reduction portion for first gear operation.

Accordingly, it is an object of the present invention to provide a simple transmission having an extended range and number of available gear ratios with a minimal centerline distance and/or axial length of transmission and countershaft portions.

Another object of the present invention is to provide a simple transmission utilizing at least one compound countershaft.

A further object of the present invention is to provide a floating mainshaft, multiple countershaft transmission wherein each of the countershafts is compounded to provide an extended range and/or number of available gear ratios within a predetermined centerline.

A further object of the present invention is to provide a unique clutch structure requiring a minimum of axial space.

These and other objects and advantages of the present invention will become apparent from a reading of the detailed description of the preferred embodiment taken in connection with the attached drawings.

DETAILED DESCRIPTION OF THE PREFERRED EMBODIMENT

Figure 1:
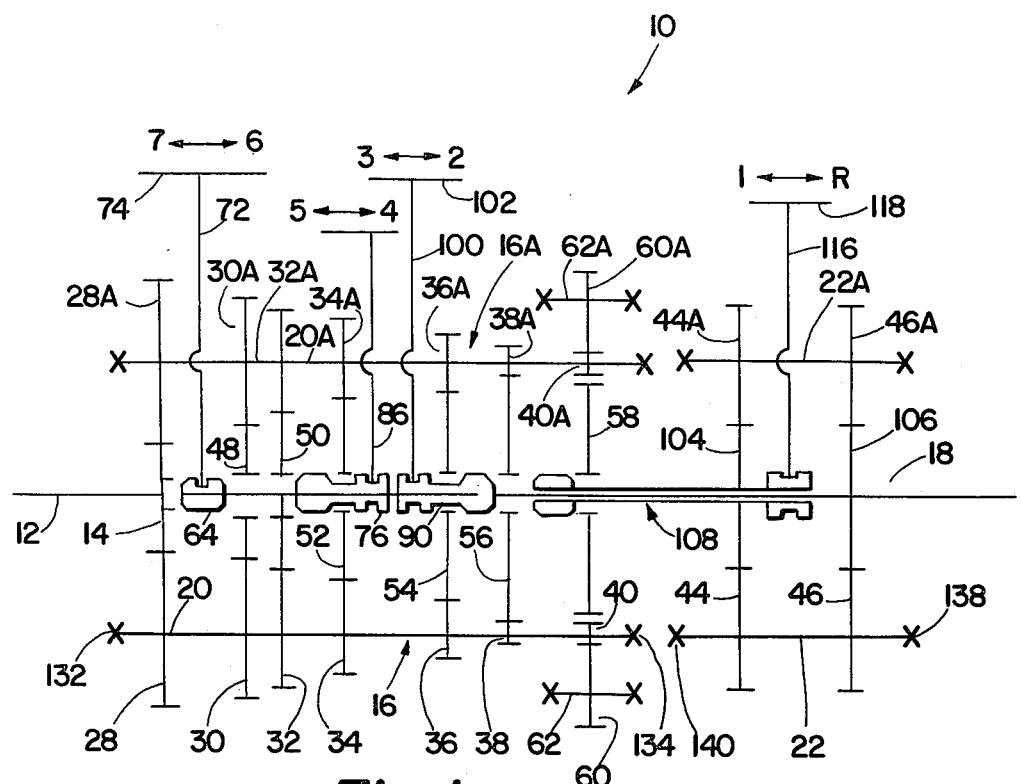
FIG. 1 is a schematic illustration of one embodiment of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives and equivalents thereof.

For convenience of identification, the shaft 12 has throughout been called the input shaft, and the shaft 18 has been called the mainshaft and output. This terminology has, however, been used for convenience in reference and is to be given no limiting significance inasmuch as the apparatus will operate with the direction of power flow reversed.

Figure 3A:
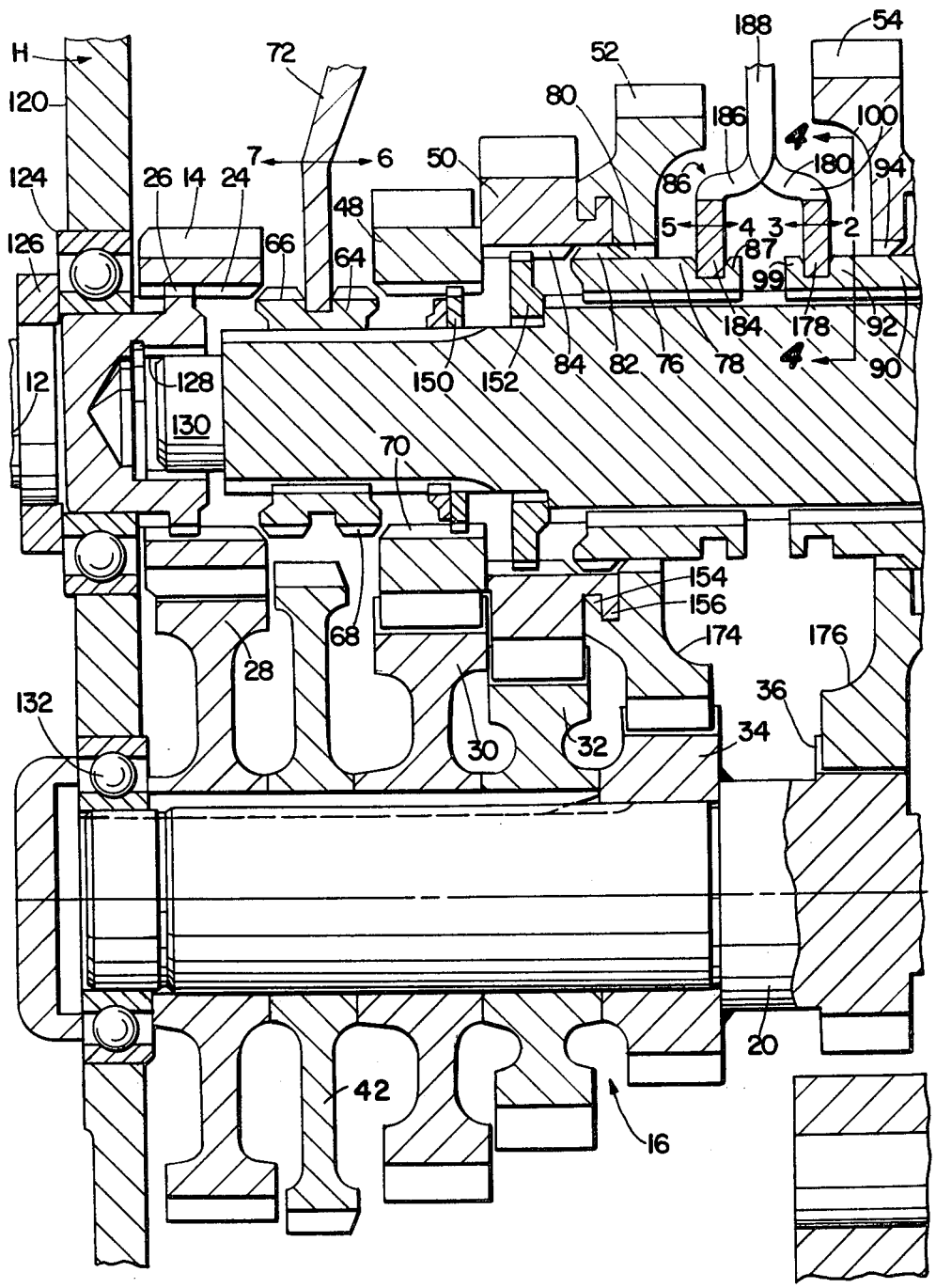
FIGS. 3A and 3B are a partial sectional view of the transmission schematically illustrated in FIG. 1.
Figure 3B:
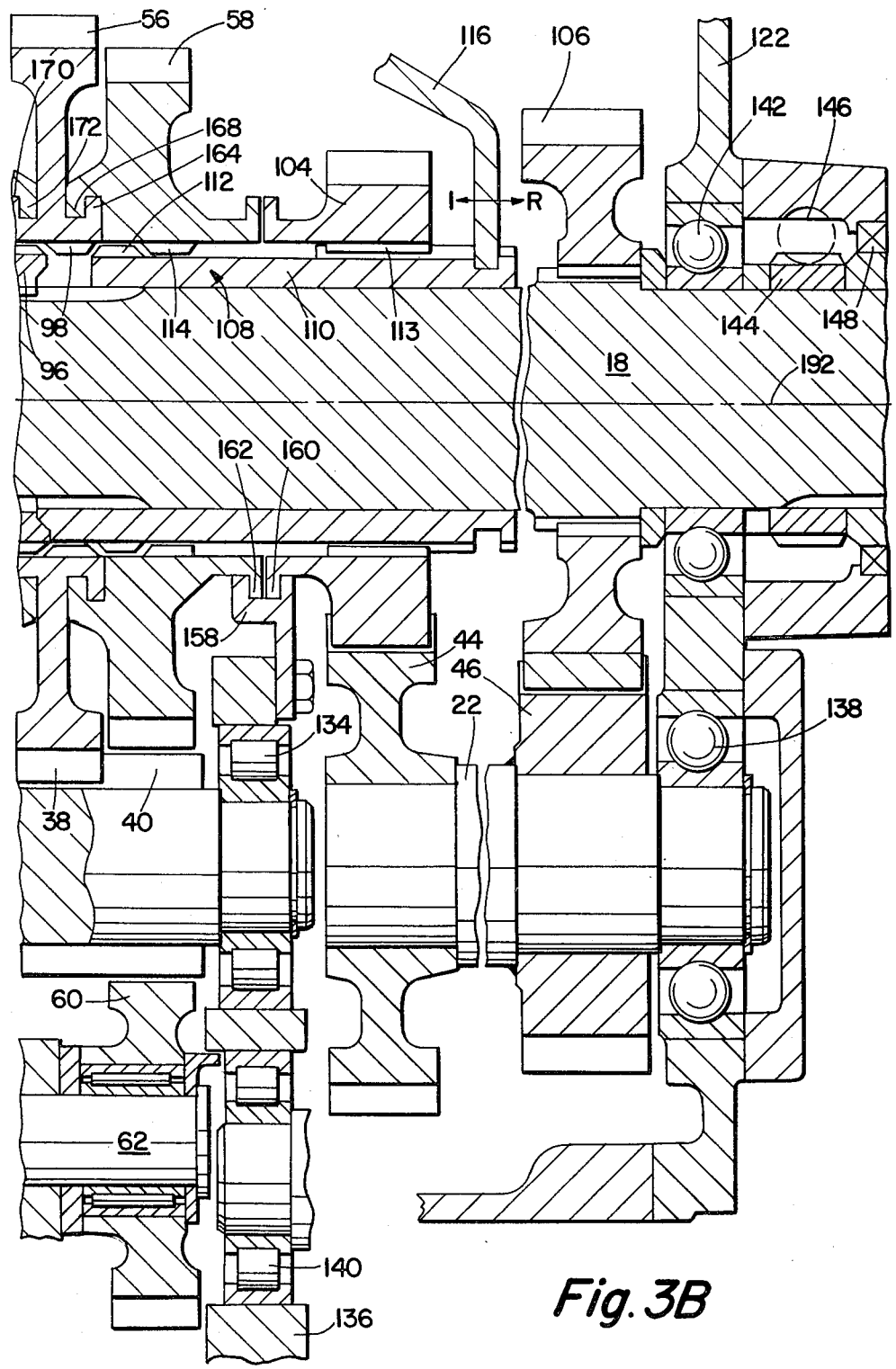

One embodiment of the transmission of the present invention may be seen by reference to FIGS. 1 and 3. The transmission 10 illustrated is of the multiple countershaft type, it being understood, however, that single countershaft transmissions may utilize many of the features of the present invention. Transmission 10 is illustrated as a seven forward speed, one reverse speed, transmission. Although the present invention is particularly well suited for such a seven speed transmission, it is not limited thereto. The transmission 10 comprises an input shaft 12 designed to be driven by the prime mover of the vehicle and carries a drive or input gear 14 thereon. A pair of compound countershafts 16 and 16A (only one of which is seen in FIG. 3) and a floating mainshaft 18 are provided. The axes of the mainshaft 18 and the compound countershafts, 16 and 16A, are substantially parallel. The axis of input shaft 12 is substantially concentric with the axis of mainshaft 18. The compound countershafts, 16 and 16A, are substantially identical. Each of the compound countershafts, 16 and 16A, comprises a forward portion, 20 and 20A, and a rearward portion, 22 and 22A, respectively. Forward countershaft portions, 20 and 20A, are separately rotatable with the rearward portions 22 and 22A, respectively. Preferably, as may be seen by reference to U.S. Pat. Nos. 3,283,613 and 3,799,002, the axes of the forward portions, 20 and 20A, are circumferentially offset from the axes of the rearward portions, 20 and 20A, to conserve axial space as is well known in the art.

As may be seen, input or drive gear 14 carries internal splines or clutch teeth 24 which are drivingly engaged with external spline teeth 26 carried by the input shaft 12.

The forward portions 20 and 20A of the compound countershafts, 16 and 16A, carry countershaft gears 28, 30, 32, 34, 36, 38, 40 and 28A, 30A, 32A, 34A, 36A, 38A and 40A, respectively. Forward countershaft portions, 20 and 20A, may also carry an additional gear, 42, for purposes of driving a power take off device ("PTO") as is well known in the art. As may be seen, one or more of the countershaft gears may be formed integrally with the countershaft portion in the form of external involute splines or the like. The rearward portions, 22 and 22A, of the compound countershafts, 16 and 16A, carry countershaft gears 44, 46 and 44A, 46A, respectively. Gears 48, 50, 52, 54 and 56 encircle the mainshaft 18 and are constantly engaged with and supported by the countershaft gear groups 30 and 30A, 32 and 32A, 34 and 34A, 36 and 36A, and 38 and 38A, respectively. Mainshaft gear 58 surrounds the mainshaft 18 and is constantly engaged with and supported by reverse idler gear group 60 and 60A which gears are, in turn, constantly engaged with countershaft gears 40 and 40A, respectively, as is well known in the art. Reverse idler gears 60 and 60A are supported on idler shafts 62 and 62A, respectively.

Axially slidable clutch 64 is splined to the mainshaft 18 for rotation therewith and carries leftward external clutch teeth 66 for engagement with the internal splines 24 of drive gear 14 and rightward external clutch teeth 68 for engagement with the internal clutch teeth 70 carried by mainshaft gear 48. Shift fork 72 is carried by a standard shift rail 74 for selective axial movement of clutch 64 to the left to engage the mainshaft with input gear 14 and therefor directly connect the mainshaft 18 with the input shaft 12 for direct or seventh speed operation of transmission 10 or for rightward axial movement of clutch 64 to couple the mainshaft gear 48 with the mainshaft 18 for sixth speed operation of the transmission 10. Of course, as is well known in the art, if an overdrive transmission is utilized, the direction of shifting clutch collar 64 will be reversed.

The term splined as used herein is intended to define various connections, such as splines, keys, etc., which will rotationally couple a clutch or gear or the like to a shaft while not necessarily preventing relative axial movement therebetween.

Axially slidable clutch tube 76 is splined to the mainshaft 18 for rotational movement therewith. Clutch tube 76 comprises a hub or tube portion 78 of an outer diameter less than the inner diameter of the interior clutch teeth 80 of mainshaft gear 52 and a bi-directional exterior clutch portion 82 for selective engagement with the interior clutch teeth 80 of mainshaft gear 52 or the interior clutch teeth 84 of mainshaft gear 50. Sliding clutch tube 76 is engaged by a shift fork 86 at the grooved shift fork receiving portion 87 at the rightward end thereof for selective rightward and leftward axial movement of sliding clutch tube 76 to clutch mainshaft gear 50 or gear 52, respectively, to the mainshaft 18 for fifth or fourth gear, respectively, operation of transmission 10. Shift fork 86 is connected to a standard shift rail 88.

Sliding clutch tube 90 is splined to mainshaft 18 for rotational movement therewith. Sliding clutch tube 90 includes a tube portion 92 of an outer diameter less than the inner diameter of internal clutch teeth 94 carried by mainshaft gear 54 and a bi-directional exterior clutch portion 96 for engagement with either internal clutch teeth 94 carried by gear 54 or internal clutch teeth 98 carried by mainshaft gear 56 to clutch gear 56 or 54, respectively, directly to mainshaft 18 for second gear or third gear, respectively, operation of transmission 10. Shift fork 100 engages sliding tube clutch 90 at the grooved shift fork receiving portion 99 of the hub portion 92 thereof adjacent the leftward end. Shift fork 100 is attached to a shift rail 102. It is noted that internal clutch teeth 98 carried by mainshaft gear 56 are bi-directional clutch teeth, that is they may be engaged from either the left or righthand end thereof, for reasons which will be discussed in greater detail below.

Mainshaft gear 104 surrounds the mainshaft 18 and is constantly engaged with and supported by countershaft gear group 44 and 44A carried by rearward countershaft portions 22 and 22A, respectively. Mainshaft gear 106 is fixed to mainshaft 18 for rotational movement therewith and is constantly engaged by countershaft gear group 46 and 46A carried by auxiliary countershaft portions 22 and 22A. Combined tube clutch idler member 108 surrounds mainshaft 18 and is preferably of a larger inner diameter than the outer diameter of mainshaft 18 permitting the tube clutch idler member 108 to float radially relative to mainshaft 18. Tube clutch-idler member 108 comprises an elongated tube portion 110 and a bi-directional exterior clutch portion 112 on the leftward end thereof. Mainshaft gear 104 is splined directly to combined tube clutch idler member tube portion 110 for rotational movement therewith and axial movement relative thereto as at splined connection 113. Splined connection 113 allows the tube clutch idler member to be axially movable relative to mainshaft gear 104. Bi-directional exterior clutch tooth portion 112 of combined tube clutch idler member 108 may be moved axially to the left to engage internal clutch teeth 98 of mainshaft gear 56 to clutch mainshaft gear 56 directly to the tube clutch idler member 108 or moved axially to the right to engage internal clutch teeth 114 of mainshaft gear 58 to engage mainshaft gear 58 directly to the tube clutch-idler member 108. A shift fork 116 engages the elongated tube portion of tube clutch-idler member 108 adjacent the right end thereof for selective axial movement thereof. Shift fork 116 is connected to shift rail 118.

Figure 2:
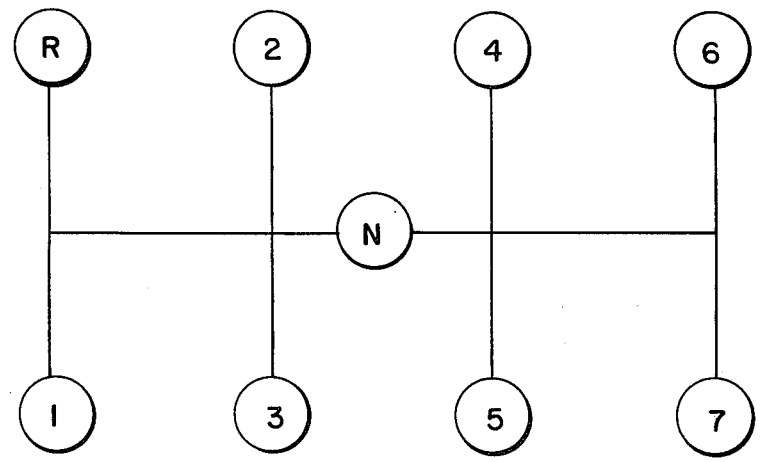
FIG. 2 is a schematic illustration of the shift pattern for the transmission of FIG. 1.

Shift rails 74, 88, 102 and 118 comprise a standard four rail shift bar assembly having a standard "H" or "HH" shift pattern of the type seen in FIG. 2. Of course, shift rails 74, 88, 102 and 118 might be remotely controlled or might be controlled by means of electric solenoids, fluid pistons or the like. Preferably, interlock means are provided to assure that only one shift rail may be displaced from its neutral or axially centered position at any given time.

The operation and structural features of the "floating mainshaft" multiple countershaft type of transmission described above is well known in the prior art and a more detailed description thereof may be seen by reference to U.S. Pat. Nos. 3,105,395 and 3,500,695, all of which are assigned to the assignee of this invention and all of which have been incorporated by reference.

In operation, input shaft 12 is driven by a prime mover, usually through a normally engaged, selectively disengaged friction master clutch (not shown). The input shaft 12 drives input or drive gear 14 which is constantly engaged with gears 28 and 28A to drive the forward portions, 20 and 20A, of the compound countershafts, 16 and 16A, respectively, and all of the countershaft gears mounted thereon. The forward countershaft portion countershaft gears 30, 30A, 32, 32A, 34, 34A, 36, 36A, 38, 38A and the reverse idlers, 60 and 60A, which are constantly meshed with forward countershaft portion countershaft gears 40 and 40A, respectively, are constantly engaged with the mainshaft gears 48, 50, 52, 54, 56, and 58, respectively. Mainshaft gears 48, 50, 52, 54, 56 and 58 are thus constantly rotating whenever the input shaft is rotating. Mainshaft gear 104 is splined to the combined tube clutch idler member 108 and is constantly meshed with rearward countershaft portion countershaft gears 44 and 44A. Mainshaft gear 106 is constantly meshed with rear countershaft portion countershaft gears 46 and 46A. Accordingly, mainshaft gears 104 and 106 and the rearward countershaft portion countershaft gears 44, 44A and 46, 46A will be constantly rotating whenever combined tube clutch idler member 108 is clutched to either mainshaft gear 56 or mainshaft gear 58 and the input shaft 12 is rotating and whenever the mainshaft 18 is clutched to any of mainshaft gears 48, 50, 52, 54, 56 or 58, or the input gear 14, and the input shaft is rotating.

Reverse operation may be selected by axial movement of combined tube clutch-idler member 108 to the right to engage idler member 108 with gear 58. Such operation will cause gear 58 to drive idler member 108 in a reverse direction through countershaft gears 40 and 40A and idler gears 60 and 60A resulting in gear 104 driving countershaft gears 44 and 44A and the rear countershaft portions 22 and 22A and rear countershaft portion countershaft gears 46 and 46A which in turn will drive mainshaft gear 106 and mainshaft 108 which is rotationally fixed thereto. Low or first gear operation may be achieved by a leftward axial movement of combined tube clutch idler member 108 sufficiently to cause idler member 108 to engage mainshaft gear 56. Engagement of idler member 108 with gear 56 will cause mainshaft gear 104 to drive rearward countershaft gears 44 and 44a and rearward countershaft gears 46 and 46A and thereby mainshaft gear 106 and mainshaft 18 which is rotationally fixed thereto. It may thus be seen that the reverse and low gear operations of transmission 10 are through a double reduction, that is the first reduction from drive gear 14 to forward countershaft gears 28 and 28A the reduction of countershaft gears 38 and 38A or 40, 40A with mainshaft gears 56 or 58, respectively, and the second reduction of mainshaft gear 104 through the rearward countershaft assembly comprising rear countershaft gears 44 and 44A, countershafts 22 and 22A, rear countershaft gears 46 and 46A and mainshaft gear 106. This additional reduction is achieved without the necessity of increasing the centerline distances between the axes of the mainshaft and the countershafts and without the necessity of providing a compound transmission with a two-piece mainshaft and the somewhat complicated controls required therefor. Additionally, as each countershaft 16, 16A, is comprised of two separately supported portions, 20, 22 and 20A, 22A, respectively, the axial length of each countershaft portion between its support bearings is maintained at an acceptable value.

To achieve second and third gear operations, respectively, of transmission 10, axially slidable tube clutch 90 is moved to the right to engage mainshaft gear 56 or the left to engage mainshaft gear 54, respectively, with the mainshaft. To achieve fourth or fifth speed operation of transmission 10, the sliding tube clutch 76 is moved to the right or the left, respectively, to engage mainshaft gear 52 or 50, respectively, with the mainshaft 18. To achieve sixth speed or seventh speed (direct drive) operation of transmission 10, sliding clutch collar 64 is moved to the right or the left, respectively, to couple either mainshaft gear 48 with mainshaft 18 or to couple drive gear 14 and thereby input shaft 12 directly with the mainshaft 18.

As combined tube clutch-idler member 108 is preferably free to radially float relative to the mainshaft 18, and as mainshaft gears 58 and 104 are free to float radially relative to the tube clutch idler member 108, the mainshaft gears 56, 58 and 104 will tend to move radially to share equally, or substantially equally, the torque load between the countershaft gears engaged therewith as is known in the art.

The transmission 10 includes horizontally or vertically split housing H only a portion of which is shown. The housing H has a forward end wall 120 and a rearward end wall 122. Each of said walls is provided with openings for receipt of the various shaft bearings. The input shaft 12 supported by a bearing 124 and may be provided with a seal member 126. The input shaft 12 is provided with a rearwardly facing cavity 128, or pocket, in which a forward stepped down portion 130 of mainshaft 18 is loosely received. The forward portions 20 and 20A of the compound countershafts 16 and 16A are supported by bearings 132 in the forward end wall 120 of housing H and bearings 134 supported in an intermediate wall 136 of housing H. The rearward countershaft portions 22 and 22A of compound countershafts 16 and 16A are supported by bearings 138 in rearward end wall 122 and bearings 140 in intermediate wall 136 of housing H. The rearward end of the mainshaft 18 is pivotably supported in a bearing 142 in an endwall 122 of housing H. Further details as to the mounting of the mainshaft may be seen by reference to U.S. Pat. No. 3,500,695. This type of a floating mounting of the mainshaft is for descriptive purposes only and is not intended to be limiting.

Synchronizers and/or blocking rings can, if desired, be provided between the exterior clutch teeth associated with the various clutch units and the internal clutch teeth associated with the various mainshaft gears.

A tooth ring 144 may be attached to the mainshaft for purposes of driving a speedometer adapter 146 or the like as is well known in the art. Sealing means, such as seal 148 may be provided in housing H adjacent the output end of the mainshaft 18.

Mainshaft gears 48 and 50 are restrained from axial movement relative to mainshaft 18 by means of an abutment rings 150 and 152. Mainshaft gear 52 is restrained from axial movement relative to mainshaft 18 by means of a flanged portion 154 which cooperates with a flanged portion 156 on mainshaft gear 50. Mainshaft gears 58 and 104 are restrained from axial movement relative to mainshaft 18 by means of a simi-circular generally U-shaped flange member 158 mounted to intermediate wall member 136 which will cooperate with the up-raised flange portions 160 and 162 of mainshaft gears 104 and 58, respectively. Mainshaft gear 56 is provided with a generally W-shaped flange portion comprising a rightward up-raised portion 164 which will cooperate with a flange portion 168 on mainshaft gear 58 and a leftward up-raised flange portion 170 which will cooperate with a flange portion 172 on mainshaft gear 54 to restrain axial movement of mainshaft gears 56 and 54 relative to mainshaft 18. Preferably, flange portions 172 and 168 of mainshaft gears 54 and 58, respectively, are noncontinuous for purposes of allowing assembly of mainshaft gears to the mainshaft of the transmission. The use of flanges 154, 156, 160, 162, 168, 170, 172 and U-shaped plate 158 is required as the tube clutch members 76 and 90 and combined tube clutch-idler member 108 prevent direct axial fixing of the mainshaft gears to the mainshaft. The specific structure for axially fixing the mainshaft gears is for illustrative purposes only and is not intended to be limiting.

Mainshaft gear 52 is provided with a rightwardly facing generally concave undercut portion or pocket 174 while mainshaft gear 54 is provided with a leftwardly facing undercut portion or pocket 176. Undercut portions 174 and 176 face one another and together provide axial room for axial shifting of shift forks 86 and 100. Thus, four mainshaft gears, 50, 52, 54 and 56 may be selectively clutched, one at a time, to mainshaft 18 by means of a split, side by side shift fork structure comprising shift forks 86 and 100 within substantially the axial space normally reserved for a single clutch collar capable of clutching only two mainshaft gears to the mainshaft. The axial length of the transmission 10 is thus reduced and/or wider tooth faces for greater torque carrying capacity can be provided within a given axial length of transmission.

Figure 4:
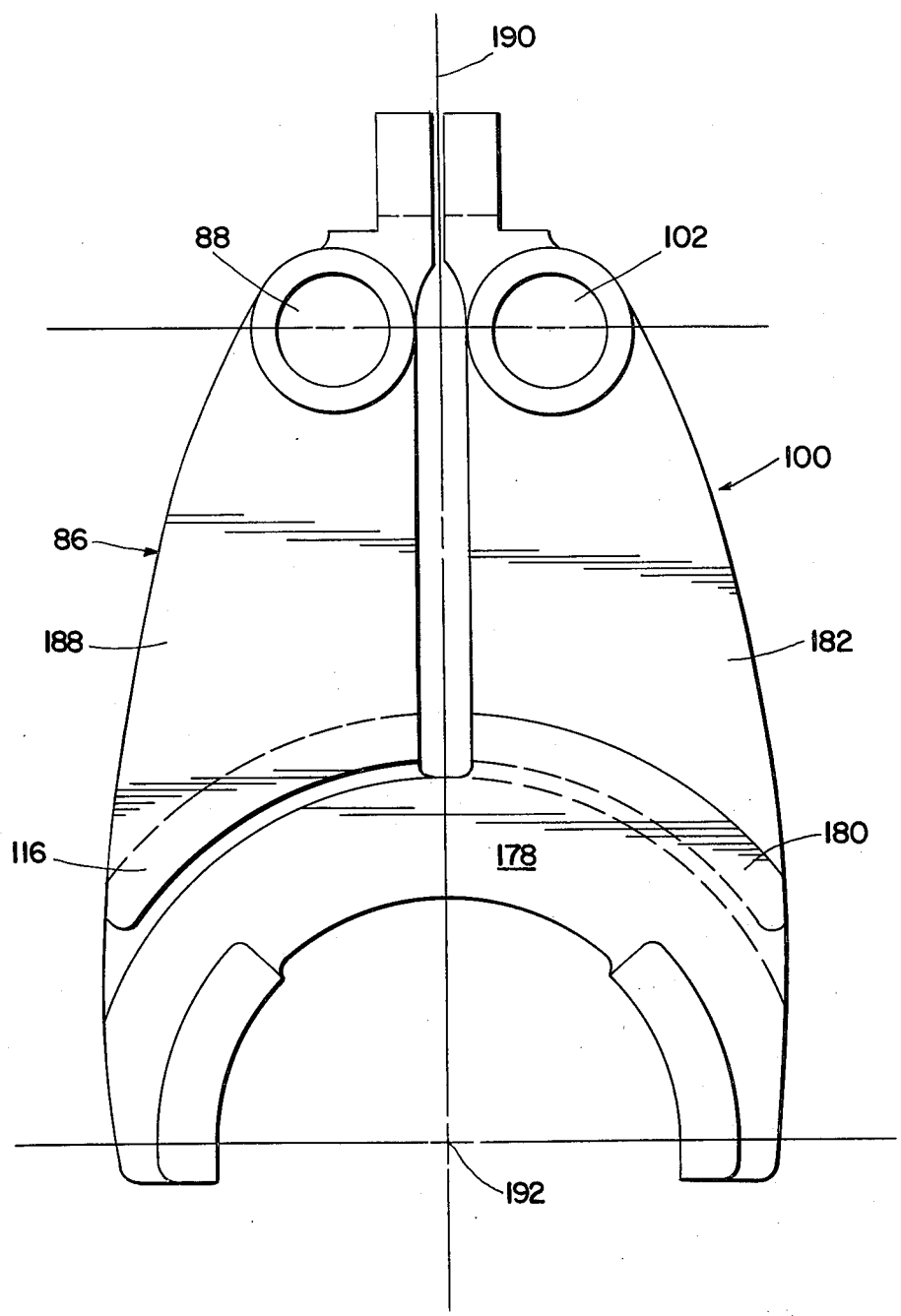
FIG. 4 is a sectional view of the split side by side shift fork structure taken substantially along line 4—4 in FIG. 3A.

The split, side by side shift fork structure of shift forks 86 and 100 may be seen in greater detail by reference to FIG. 4. Shift fork 100 comprises a generally semi-circular vertically extending portion 178 for receipt within a groove within the sliding tube clutch 90, a generally horizontally extending portion 180 and a generally vertically extending portion 182 for attachment to the shift rail 102. Shift fork 86 comprises a generally vertically extending semi-circular portion 184 for engagement within a groove provided in the righthand end of sliding tube clutch 76, a generally horizontally extending portion 186 and a generally vertically extending portion 188 for attachment to the shift rail 88. Portions 180 and 182 of shift fork 100 lie on the opposite side of a generally vertically extending plane 190 containing the axis 192 of the mainshaft 18 than do the portions 186 and 188 of shift fork 86 and thus allow the vertical portions 182 and 188 and horizontal portions 180 and 186 of shift forks 100 and 86, respectively, to be axially aligned relative to mainshaft 18 thus requiring a minimum of space between the mainshaft gears 52 and 54 for proper operation of sliding tube clutches 76 and 90.

Although this invention has been described in its preferred form with a certain degree of particularity, it is understood that the present disclosure of the preferred form has been made by way of example and that numerous changes in the details of construction and combination and arrangement of the parts may be resorted to without departing from the spirit and the scope of the invention as hereinafter claimed.

I claim:

1. A change gear transmission clutch structure comprising:
    a rotatable shaft;
    a first gear coaxially surrounding said shaft and rotatable relative thereto;
    a second gear coaxially surrounding said shaft and rotatable relative thereto, said second gear having central opening therethrough, said second gear axially spaced from said first gear in a first axial direction;
    a third gear coaxially surrounding said shaft and rotatable relative thereto, said third gear having central opening therethrough, said third gear axially spaced from said second gear in said first axial direction whereby said second gear is axially interposed said first and third gears;
    a fourth gear coaxially surrounding said shaft and rotatable relative thereto, said fourth gear axially spaced from said third gear in said first axial direction whereby said third gear is axially interposed said second and fourth gears;
    said first, second, third and fourth gears each carrying clutch teeth fixed thereto; and
    means for selectively clutching said gears one at a time to said shaft, said clutching means comprising:
    a first tube clutch splined to said shaft for rotation therewith and axial movement relative thereto, said first tube clutch comprising an elongated first tube portion surrounding said shaft and received through the central opening in said second gear, a first bi-directional clutch tooth portion normally axially interposed the clutch teeth of said first and second gears and a first shift fork receiving portion axially interposed said second and third gear for engagement by a first shift fork, said first bi-directional clutch portion engageable with said first gear clutch upon axial movement of said first tube clutch in the second axial direction and engageable with the second gear clutch teeth upon axial movement of said first tube clutch in said first axial direction, and a second tube clutch splined to said shaft for rotation therewith and axial movement relative thereto, said second tube clutch comprising an elongated second tube portion surrounding said shaft and received through the central opening in said third gear, a second bi-directional clutch tooth portion normally axially interposed the clutch teeth of said third and fourth gears and a second shift fork receiving portion axially interposed said first shift fork receiving portion of said first tube clutch and said third gear for engagement by a second shift fork, said second bi-directional clutch portion engageable with said third gear clutch teeth upon axial movement of said second tube clutch in the second axial direction and engageable with said fourth gear clutch teeth upon axial movement of said second tube clutch in the first axial direction.

2. The transmission clutch structure of claim 1, wherein said shaft is a mainshaft, each of said gears are mainshaft gears each constantly meshed with and supported by at least two substantially identical countershaft gears arranged on countershafts extending generally parallel to and equally circumferentially spaced around said mainshaft.

3. The transmission clutch structure of claim 2, wherein said second gear has an annular pocket formed in the radially extending face thereof facing said third gear and said third gear has an annular pocket formed in the radially extending face thereof facing said second gear, said pockets having an inner diameter greater than the outer diameter of the portions of said first and second shift forks engaging said first and second shift fork receiving portions.

4. The transmission of claim 2, wherein said first and fourth gears have central openings therethrough and said clutch teeth carried by said gears are internal clutch teeth formed on the central openings thereof, the inner diameter of the internal clutch teeth carried by said second and third gears being greater than the exterior diameter of said first and second tube portions, said first and second bi-directional clutch portions comprising external clutch teeth having tapered ends at both axial ends thereof.

5. The transmission clutch structure of claim 4, wherein said bi-directional clutch portion external teeth are substantially continuous along the axial length thereof.

6. The transmission clutch structure of claims 1, 2, 3 or 4 wherein said first shift fork comprises a first shift rail engaging portion extending generally radially inwardly from a first shift rail, a first connecting portion extending generally axially from the radially inward end of said first shift rail engaging portion in said second axial direction and a first generally semi-arcuate portion extending radially inwardly from the end of said first connecting portion most axially remote said first shift rail engaging portion for receipt in an annular groove in said first shift fork receiving portion and said second shift fork comprises a second shift rail engaging portion extending generally radially inwardly from a second shift rail, a second connecting portion extending generally axially from the radially inward end of said second shift rail engaging portion in said first axial direction and a second generally semi-arcuate portion extending radially inwardly from the end of said second connecting portion most remote said second shift rail engaging portion for receipt in an annular groove in said second shift fork receiving portion, said first shift rail engaging portion and a section of said first connecting portion axially aligned in side by side relationship with said second shift rail engaging portion and a section of said second connecting portion.

7. The transmission clutch structure of claim 6, wherein said first shift rail connecting portion and said section of said first connection portion are on the opposite side of a plane containing the axis of said shaft from said second shift rail engaging portion and said section of said second connecting portion.

8. The transmission clutch structure of claim 7, wherein said first and second generally semi-arcuate portions have an outer diameter less than the inner diameter of said first and second pockets respectively.

9. The transmission of claim 7, wherein said first and second shift rail engaging portion extend axially between said second and third gears.

10. A change gear transmission comprising:
an input shaft having an input gear supported thereon for rotation therewith;
a mainshaft generally coaxial with said input shaft;
a plurality of mainshaft gears surrounding said mainshaft for free rotation relative thereto;
at least two substantially identical countershafts having axes of rotation substantially parallel with the axis of rotation of said mainshaft, each of said countershafts carrying a like plurality of countershaft gears for rotation therewith, one substantially identical countershaft gear on each of said countershafts being in constant meshing engagement with each mainshaft gear, said mainshaft gear supported on the countershaft gears in meshing engagement therewith, each of said countershafts comprising a forward portion carrying a countershaft gear meshed with said input gear to establish a driving relation between said input shaft and said countershaft, and a rearward portion;
an output gear fixed to said mainshaft for rotation therewith;
an idler sleeve surrounding said mainshaft, said idler sleeve carrying idler clutch means fixed for rotation therewith and an idler gear fixed for rotation therewith;
each of said rearward countershaft portions carrying a first substantially identical rear countershaft gear constantly engaged with said output gear and a second rear countershaft gear constantly engaged with said idler gear;
a reverse mainshaft gear surrounding said mainshaft for free rotation relative thereto, said reverse mainshaft gear constantly meshingly engaged with and supported by a reverse idler gear which in turn is constantly meshingly engaged with a countershaft gear carried by said forward countershaft portion;
means to selectively clutch said mainshaft gears one at a time to said mainshaft; and
means to selectively clutch one of said mainshaft gears and said reverse mainshaft gear one at a time to said idler sleeve.

11. The transmission of claim 10, wherein said mainshaft gears and said reverse mainshaft gear are radially movable relative to the axis of rotation of said mainshaft.

12. The change gear transmission of claim 11, wherein said idler sleeve is radially movable relative to said mainshaft.

13. The transmission of claim 10, wherein said one mainshaft gear and said reverse mainshaft gear are axially adjacent and said idler sleeve comprises a generally tubular portion extending through the central opening of one of said one mainshaft gear and reverse mainshaft gear, a bi-directional clutch portion normally axially interposed said one mainshaft gear and said reverse mainshaft gear and selectively engageable one at a time with clutch teeth carried by said one mainshaft gear and said reverse mainshaft gear, and a flange portion for engagement with a shift fork for axially sliding said idler sleeve, said idler gear splined to said idler sleeve for rotation therewith and axial movement relative thereto.

14. The transmission of claim 13, wherein said one mainshaft gear is axially interposed said bi-directional clutch portion and a clutch sleeve splined to said mainshaft.

15. The transmission of claims 13 or 14, wherein said transmission provides seven forward speeds and one reverse speed of operation, said one mainshaft gear being clutchable directly to said mainshaft for second speed operation of said transmission, said one mainshaft gear being clutchable to said idler shaft for first speed operation of said transmission and said reverse mainshaft gear being clutchable to said idler shaft for reverse speed operation of said transmission.

* * * * *